(12) United States Patent
Proudkii et al.

(10) Patent No.: US 9,295,968 B2
(45) Date of Patent: Mar. 29, 2016

(54) METHOD AND APPARATUS FOR ELECTROMAGNETICALLY PRODUCING A DISTURBANCE IN A MEDIUM WITH SIMULTANEOUS RESONANCE OF ACOUSTIC WAVES CREATED BY THE DISTURBANCE

(75) Inventors: Vassilli P. Proudkii, Edmonton (CA); Joe Michael Yarborough, Tucson, AZ (US); Kirk McNeil, Edmonton (CA)

(73) Assignee: RF THUMMIM TECHNOLOGIES, INC. (CA)

( * ) Notice: Subject to any disclaimer, the term of this patent is extended or adjusted under 35 U.S.C. 154(b) by 807 days.

(21) Appl. No.: 13/635,497

(22) PCT Filed: Mar. 17, 2011

(86) PCT No.: PCT/US2011/028810
§ 371 (c)(1),
(2), (4) Date: Nov. 27, 2012

(87) PCT Pub. No.: WO2011/116187
PCT Pub. Date: Sep. 22, 2011

(65) Prior Publication Data
US 2013/0062193 A1    Mar. 14, 2013

Related U.S. Application Data

(60) Provisional application No. 61/314,921, filed on Mar. 17, 2010.

(51) Int. Cl.
*B01J 19/12*   (2006.01)
*B01J 19/08*   (2006.01)
(Continued)

(52) U.S. Cl.
CPC  *B01J 19/088* (2013.01); *B01J 3/08* (2013.01);

*B01J 19/10* (2013.01); *B01J 19/12* (2013.01); *B01J 19/126* (2013.01); *C10G 1/04* (2013.01); *C10G 31/06* (2013.01);
(Continued)

(58) Field of Classification Search
None
See application file for complete search history.

(56) References Cited

U.S. PATENT DOCUMENTS

| | | | |
|---|---|---|---|
| 2,676,257 A | 4/1954 | Hebenstreit | 343/768 |
| 2,714,661 A | 8/1955 | Norton | 331/3 |

(Continued)

FOREIGN PATENT DOCUMENTS

| | | | | |
|---|---|---|---|---|
| JP | H1116675 | 1/1999 | | H05B 6/70 |
| JP | 2006512189 | 4/2006 | | B01J 19/00 |

OTHER PUBLICATIONS

International Preliminary Report on Patentability issued for application No. PCT/US2011/028810, dated Sep. 18, 2012 (7 pgs).
(Continued)

*Primary Examiner* — Kishor Mayekar
(74) *Attorney, Agent, or Firm* — Hayes Soloway P.C.

(57) ABSTRACT

A method for promoting chemical changes in a medium comprising the steps of placing a medium within an electromagnetically resonant structure that permits initiating a spark or a discharge in the medium by means of applying pulsed microwave energy in an electromagnetically resonant structure, the electromagnetically resonant structure being simultaneously mechanically resonant for acoustic or shock waves generated by the spark or discharge caused by the pulsed resonant microwave electromagnetic field; and providing a means to feed material into a reaction chamber within the electromagnetically resonant structure and collecting products of a reaction inside the reaction chamber.

10 Claims, 1 Drawing Sheet

(51) Int. Cl.
| | |
|---|---|
| *B01J 3/08* | (2006.01) |
| *B01J 19/10* | (2006.01) |
| *C10G 1/04* | (2006.01) |
| *C10G 31/06* | (2006.01) |

(52) U.S. Cl.
CPC .... *B01J 2219/089* (2013.01); *B01J 2219/0875* (2013.01); *B01J 2219/0877* (2013.01); *B01J 2219/0879* (2013.01); *B01J 2219/0884* (2013.01); *B01J 2219/0886* (2013.01); *B01J 2219/1269* (2013.01); *C10G 2300/1033* (2013.01); *C10G 2300/302* (2013.01)

(56) References Cited

U.S. PATENT DOCUMENTS

| | | | |
|---|---|---|---|
| 3,170,519 A | 2/1965 | Haagensen | 166/60 |
| 3,442,758 A | 5/1969 | Penfold et al. | |
| 3,588,594 A | 6/1971 | Matsuno et al. | 315/111.21 |
| 3,882,424 A | 5/1975 | Debois et al. | 332/127 |
| 4,004,122 A | 1/1977 | Hallier | 219/697 |
| 4,077,870 A | 3/1978 | Horowitz | 208/128 |
| 4,153,533 A | 5/1979 | Kirkbride | 204/157.15 |
| 4,279,722 A | 7/1981 | Kirkbride | 204/157.15 |
| 4,309,259 A | 1/1982 | Sarma et al. | 204/164 |
| 4,336,434 A | 6/1982 | Miller | 219/747 |
| 4,435,260 A | 3/1984 | Koichi et al. | 204/164 |
| 4,565,670 A | 1/1986 | Miyazaki et al. | 422/186.04 |
| 4,631,380 A | 12/1986 | Tran | 219/697 |
| 4,728,368 A | 3/1988 | Pedziwiatr | 422/20 |
| 4,792,732 A | 12/1988 | O'Loughlin | 315/334 |
| 4,855,695 A | 8/1989 | Samardzija | 333/17.3 |
| 4,883,570 A | 11/1989 | Efthimion et al. | 204/164 |
| 4,913,928 A | 4/1990 | Sugita et al. | 427/39 |
| 4,922,180 A | 5/1990 | Saffer et al. | 324/639 |
| 4,934,561 A | 6/1990 | Ness et al. | 222/1 |
| 4,946,537 A | 8/1990 | Hijikata | 156/345.42 |
| 4,957,606 A | 9/1990 | Juvan | 204/164 |
| 4,968,403 A | 11/1990 | Herbst et al. | 208/113 |
| 5,063,329 A | 11/1991 | Okamoto | 315/111.21 |
| 5,079,507 A | 1/1992 | Ishida et al. | 333/17.3 |
| 5,114,684 A | 5/1992 | Walker | 422/21 |
| 5,200,043 A | 4/1993 | Ooe et al. | 205/763 |
| 5,262,610 A | 11/1993 | Huang et al. | 219/121.43 |
| 5,273,609 A | 12/1993 | Moslehi | 156/345 |
| 5,279,669 A | 1/1994 | Lee | 118/723 |
| 5,349,154 A | 9/1994 | Harker et al. | 117/102 |
| 5,362,451 A | 11/1994 | Cha | 422/186.3 |
| 5,389,153 A | 2/1995 | Paranjpe et al. | 118/723 |
| 5,447,052 A | 9/1995 | Delaune et al. | 73/19.09 |
| 5,471,037 A | 11/1995 | Goethel et al. | 219/750 |
| 5,507,927 A | 4/1996 | Emery | 204/157.43 |
| 5,521,605 A | 5/1996 | Koike | 343/702 |
| 5,539,209 A | 7/1996 | Maarschalkerweerd | 422/24 |
| 5,540,886 A | 7/1996 | Warmbier et al. | 422/21 |
| 5,770,982 A | 6/1998 | Moore | 333/32 |
| 5,834,744 A | 11/1998 | Risman | 219/697 |
| 5,902,404 A | 5/1999 | Fong et al. | 118/723 |
| 5,907,221 A | 5/1999 | Sato et al. | 315/111.51 |
| 5,911,885 A | 6/1999 | Owens | 204/155 |
| 5,914,014 A | 6/1999 | Kartchner | 204/157.15 |
| 5,929,570 A | 7/1999 | Shinohara et al. | 315/111.21 |
| 6,027,698 A | 2/2000 | Cha | 422/186 |
| 6,034,346 A | 3/2000 | Yoshioka | 118/723 MW |
| 6,040,547 A | 3/2000 | Antonova et al. | 219/121.43 |
| 6,057,645 A | 5/2000 | Srivastava et al. | 315/111.21 |
| 6,077,400 A | 6/2000 | Kartchner | 204/157.15 |
| 6,187,206 B1 | 2/2001 | Bernier et al. | 210/721 |
| 6,187,988 B1 | 2/2001 | Cha | 588/227 |
| 6,192,318 B1 | 2/2001 | Yogo et al. | 333/17.3 |
| 6,193,878 B1 | 2/2001 | Morse et al. | 422/186 |
| 6,207,023 B1 | 3/2001 | Cha | 204/157.3 |
| 6,259,334 B1 | 7/2001 | Howald | 333/17.3 |
| 6,261,525 B1 | 7/2001 | Minaee | 422/186 |
| 6,409,975 B1 | 6/2002 | Seyed-Yagoobi et al. | 422/186 |
| 6,419,799 B1 | 7/2002 | Cha | 4/157.3 |
| 6,572,737 B2 | 6/2003 | Dalton | 204/157.15 |
| 6,576,127 B1 | 6/2003 | Ohkawa | 210/222 |
| 6,592,723 B2 | 7/2003 | Cha | 4/157.52 |
| 6,605,750 B1 | 8/2003 | Bessho et al. | 588/212 |
| 6,621,525 B1 | 9/2003 | Ueda et al. | 348/618 |
| 6,677,828 B1 | 1/2004 | Harnett et al. | 333/17.3 |
| 6,683,272 B2 | 1/2004 | Hammer | 219/121.48 |
| 6,686,557 B1 | 2/2004 | Chancey et al. | 219/121.51 |
| 6,689,252 B1 | 2/2004 | Shamouiloa et al. | 204/157.15 |
| 6,693,253 B2 | 2/2004 | Boulos et al. | 219/121.52 |
| 6,696,662 B2 | 2/2004 | Jewett et al. | 219/121.48 |
| 6,740,858 B2 | 5/2004 | Tracy et al. | 422/186 |
| 6,783,633 B2 | 8/2004 | Babchin et al. | 204/164 |
| 6,809,310 B2 | 10/2004 | Chen | 250/251 |
| 6,817,388 B2 | 11/2004 | Tsangaris et al. | 141/82 |
| 6,888,116 B2 | 5/2005 | Dalton | 219/745 |
| 6,933,482 B2 | 8/2005 | Fagrell et al. | 219/695 |
| 6,960,747 B2 | 11/2005 | Risman | 333/230 |
| 7,210,424 B2 | 5/2007 | Tolmachev | 118/723 |
| 7,227,097 B2 | 6/2007 | Kumar et al. | 219/121.43 |
| 7,495,443 B2 | 2/2009 | Leussler et al. | 324/318 |
| 7,518,466 B2 | 4/2009 | Sorensen et al. | 333/17.3 |
| 7,629,497 B2 | 12/2009 | Pringle | 585/241 |
| 8,236,144 B2 | 8/2012 | Proudkii | 204/157.15 |
| 2004/0074760 A1 | 4/2004 | Portnoff et al. | 204/157.15 |
| 2004/0175294 A1 | 9/2004 | Ellison | 422/68.1 |
| 2005/0106873 A1 | 5/2005 | Hoffman et al. | 438/689 |
| 2005/0155854 A1 | 7/2005 | Shufflebotham et al. | 204/164 |
| 2006/0060464 A1 | 3/2006 | Chang | 204/164 |
| 2006/0073084 A1 | 4/2006 | Burkitbayev | 422/186 |
| 2006/0102622 A1 | 5/2006 | Gregoire et al. | 219/695 |
| 2007/0102279 A1 | 5/2007 | Novak | 204/157.6 |
| 2007/0131591 A1 | 6/2007 | Pringle | 208/402 |
| 2007/0240975 A1 | 10/2007 | Foret | 204/157.15 |
| 2008/0202982 A1 | 8/2008 | Tooley | 208/106 |
| 2008/0233020 A1 | 9/2008 | Purta et al. | 422/186 |
| 2009/0078559 A1 | 3/2009 | Proudkii et al. | 204/157.15 |
| 2009/0173619 A1 | 7/2009 | Banks | 204/157.15 |
| 2009/0260973 A1 | 10/2009 | Proudkii et al. | 204/164 |

OTHER PUBLICATIONS

International Search Report and the Written Opinion issued for PCT/US2011/028810, dated May 20, 2011 (10 pgs).
Office Action issued in related U.S. Appl. No. 13/264,727, dated Apr. 15, 2014 (11 pgs).
Grundmann, M. et al. (2008). Handbook of Self Assembled Semiconductor Nanostructures for Novel Devices in Photonics and Electronics, Elsevier, 864 pgs (Office action cites p. 304) (31 pgs).
Office Action issued in U.S. Appl. No. 14/488,094, dated Aug. 28, 2015, (16 pgs).
Chinese Office Action issued in related application No. 201010149789.9, dated Jul. 3, 2014 (9 pgs).
European Office Action issued in related application No. 10 159 231.9, dated Jan. 3, 2013 (4 pgs).
International Preliminary Report on Patentability issued in related application No. PCT/US2008/077276, dated Mar. 24, 2010 (11 pgs).
International Search Report and Written Opinion issued in related application No. PCT/US2008/077276, dated Dec. 5, 2008 (16 pgs).
Korean Office Action (with translation) issued in application No. 10-2010-7007487, dated May 13, 2015 (12 pgs).
Notice of Allowance issued in related U.S. Appl. No. 12/234,503, dated Apr. 2, 2012 (10 pgs).
Notice of Allowance issued in related U.S. Appl. No. 12/420,770, dated Oct. 17, 2011 (12 pgs).
Notice of Allowance issued in related U.S. Appl. No. 13/264,727, dated May 12, 2014 (6 pgs).
Office Action issued in related U.S. Appl. No. 13/264,727, dated Nov. 25, 2013 (39 pgs).

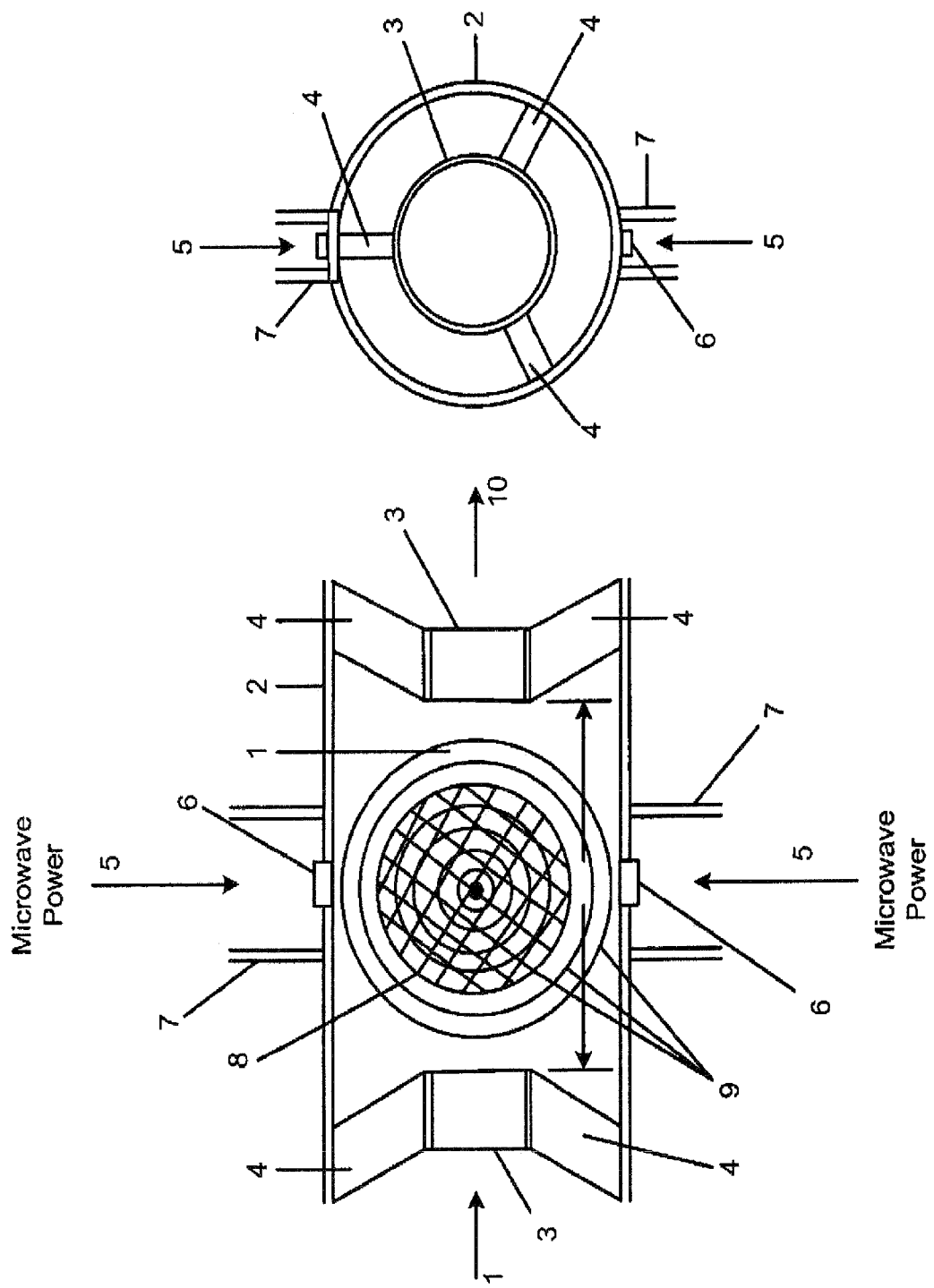

METHOD AND APPARATUS FOR ELECTROMAGNETICALLY PRODUCING A DISTURBANCE IN A MEDIUM WITH SIMULTANEOUS RESONANCE OF ACOUSTIC WAVES CREATED BY THE DISTURBANCE

This invention relates generally to processing of materials. The invention has particular utility in the use of electromagnetic energy at resonance frequencies of the material being processed to promote a chemical process or reaction, such as the breaking of chemical bonds in large molecules and will be described in connection with such utility, although other utilities are contemplated. An example of this is to break molecular bonds in long hydrocarbon chains so that shorter chain and lower weight hydrocarbons are created. Such a process could, for example, reduce heavy, viscous oil to a less viscous consistency so that it can be more easily transported through a pipe.

Petroleum-based materials are integral to the world's economy and demand for petroleum based fuels and petroleum based products is increasing. As the demand rises, there is a need to efficiently and economically process petroleum-based materials to fulfill that demand. As such, it would be advantageous to not only be able to process raw petroleum-based materials from the earth, but to recycle consumer products to recapture those petroleum-based materials.

Worldwide oil consumption is estimated at in excess of seventy million barrels per day and growing. Thus, there is a need for sufficient oil supplies. Tar sands, oil sands and oil shales, contain large quantities of oil; however, extraction of oil from these materials is costly and time-consuming.

Pumping heavy oil from oil sands is difficult. Typically, up to 30% by volume of a solvent or diluent must be added to such oil to make it thin enough to pump through pipelines. This adds a cost of as much as 15% to a barrel of oil at current prices. Thus, the ability to economically break some of the molecular bonds to make the oil less viscous could have a significant impact on the recovery of useful products from oil sands. Another problem that is becoming increasingly important is the disposal of toxic wastes. Generally to render wastes harmless requires breaking chemical bonds in the waste and possibly then adding other substances to form new bonds.

It is known that shock waves can cause various effects in matter. An extreme case is that of nuclear fusion, where a shock wave produced by nuclear fission creates pressures and temperatures high enough to initiate nuclear fusion. On a less energetic scale, sparks or detonations inside a medium can create shock waves and attendant high pressures and temperatures to cause various chemical changes in material being reacted upon.

Various means have been used to produce sparks or breakdowns in media. A common example is the shock tube, where the sudden rupturing of a diaphragm between a high pressure gas and a low pressure gas causes a shock wave to be produced in the low pressure gas. Explosions within a liquid can cause intense shock waves, for example depth charges to damage submarines. Sparks also have been observed in microwave ovens, for example in some frozen foods. Shock waves have been generated in the medical field to fragment kidney stones. Various means have also been used to focus acoustic waves in a medium, for example in lithotripsy various arrangements of transducers or reflectors have been used to focus sound waves in tissue.

The present disclosure provides a system, i.e. method and apparatus, for producing a spark or discharge in an electrodeless chamber that is excited by a pulsed electromagnetic source, where the chamber design is such that it has an appropriate chamber resonant electromagnetic mode and also the chamber is mechanically resonant with the included medium at the repetition rate of the pulsed electromagnetic source. The combined effects of the resonant electromagnetic and acoustic fields promote various chemical reactions.

The present disclosure uses microwaves in an electromagnetically resonant structure to generate electromagnetic fields sufficiently intense to cause a breakdown or spark in the enclosed medium. The resonant structure is designed so that the created acoustic or shock wave generated by the electromagnetic pulse is also resonant in the same device. This is arranged by having the mechanical resonant frequency of the resonant structure with the enclosed medium the same as the pulse repetition frequency of the electromagnetic source. In this way, the intensity of the acoustic energy is built up due to resonance. There may be one or more additional electromagnetic fields, such as, for example, continuous and/or pulsed, also present in the resonant structure to further facilitate changes to the material being reacted upon. These additional electromagnetic fields may or may not also be resonant in the resonant structure. Co-pending patent application 61/169,227 commonly-owned and incorporated herein by reference, teaches how even fields of different frequencies can be simultaneously resonant in the same resonant structure. Also, additional acoustic energy of various frequencies can be added to the resonant structure by conventional means, such as transducers, spark gaps, or other means known in the art. These additional acoustic fields may or may not be resonant within the reaction vessel.

The essential teaching of this application is that of simultaneous resonance of electromagnetic and acoustic fields in the same medium to produce a spark or discharge and resonance of the acoustic waves produced to promote chemical changes.

Further features and advantages of the present invention will be seen from the following detailed description taken in conjunction with the accompanying drawings, and wherein:

FIG. 1 shows one embodiment of the present invention.

A medium 1 either is static in or flows along a cylindrical waveguide 2. Other waveguide shapes also can be used. Two hollow electrically conducting cylinders 3 are located one half guide wavelength apart, equally separated from the point where microwaves are injected. These conducting metal cylinders serve to confine a resonant electromagnetic resonator mode that is generated by the input microwaves to the region between the metal cylinders. The metal cylinders are supported in the waveguide by insulating dielectric supports 4. The metal cylinders serve to form the ends of the resonator for the resonant electromagnetic mode. By having the length of the cylinders equal to one fourth of a guide wavelength, the open end facing the center of the structure appears as a short. For the configuration shown, the conducting rings are one half guide wavelengths apart. Thus the walls of the cylindrical waveguide 2 and the hollow metal cylinders 3 form a resonator for a Homn-mode oscillations. This mode has cylindrical symmetry and is zero at the walls of the waveguide and at the end of the hollow metal electrodes facing the center of the device, with the electromagnetic field being greatest in the volume between the metal rings.

Microwave radiation 5 of the appropriate wavelength is injected into the waveguide through a window 6 that is transparent to the microwaves and can withstand very high pressures that are generated by a spark or plasma formed between the metal rings. If the medium is a liquid, extremely high pressures can be generated, forming shock waves. Microwaves are conducted to the resonant structure by appropriate means. Waveguides 7 are shown in FIG. 1, but other means such as transmission lines can be used where appropriate.

High power microwave pulses are fed into the cylindrical reaction volume through the input windows 6, and a spark and also possibly a plasma 8 is generated in the medium within the reaction device. Acoustic or shock waves 9 propagate out from the initial spark. The resonant structure is designed so that it is mechanically resonant at the repetition frequency of the input microwave pulses, so that a large, resonant acoustic field is built up in the medium being reacted upon. One means for accomplishing this for example is by having the transit time of a generated acoustic wave from the spark or discharge region to the waveguide wall and back equal to the time between successive input electromagnetic pulses. The combination of the large electromagnetic and acoustic fields causes chemical changes in the medium being reacted upon.

The medium being reacted upon can be gasses, liquids, powders, solids, or a mixture of these. The discharge in the medium causes a sharp increase in hydraulic and hydrodynamic effects, multiple ionization of compounds and elements, intensive chemical synthesis, polymerization, and breaking of chemical bonds. A means is provided to suitably collect products 10 from the reaction.

Additionally, other continuous or pulsed microwave sources can be coupled into the reaction volume to further promote chemical changes. Additional acoustic sources also can be coupled to the volume by appropriate means known to those in the art. Some of these means are for example mechanical transducers, shock tubes, spark gaps, and other mechanical means.

Although the invention has been explained with regard to a cylindrical waveguide with internal confining metal cylinders one half guide wavelength apart, it will be understood that these cylinders can be any odd number of guide wavelengths apart. In the case of a cylindrical waveguide, this would support an H1mn mode rather than a H0mn mode. In this case, additional microwave inputs would be present at appropriate electromagnetic field maxima to couple to this mode. Additionally, different waveguide shapes can be used. Also, the conducting cylinders can be any odd number of guide wavelengths long.

It will be understood that multiple resonant structures also can be used in series. For example, in the case of a flowing liquid, various structures with different electromagnetic and/or acoustic resonant frequencies can be used to cause sequential changes in the material being reacted upon. In this case, the waveguide must be sized appropriately for the resonant frequencies involved. The reaction chamber must be designed to withstand very high pressures and temperatures that may be generated by the electromagnetic and acoustic fields.

While the invention has been explained with regard to a particular embodiment, many combinations of the electromagnetic and acoustic resonant fields and auxiliary electromagnetic and acoustic inputs, both pulsed and continuous will be appreciated by those skilled in the art.

The invention claimed is:

1. A method for promoting chemical changes in a medium comprising the steps of:
   providing a medium to an electromagnetically resonant structure and initiating a spark or a discharge in the medium by applying pulsed microwave energy from a plurality of microwave sources to the electromagnetically resonant structure, the electromagnetically resonant structure being simultaneously mechanically resonant for acoustic or shock waves generated by the spark or discharge caused by the pulsed microwave energy;
   providing additional medium into a reaction chamber within the electromagnetically resonant structure; and
   collecting products of a reaction of the provided medium.

2. The method of claim 1, wherein the medium is static in the reaction chamber.

3. The method of claim 1, wherein the medium flows through the reaction chamber.

4. The method of claim 1, wherein the pulsed microwave energy generates an electromagnetic field, and wherein the reaction chamber is formed so that the electromagnetic field is confined by at least two conducting cylinders that are spaced an odd number of guide wavelengths apart.

5. The method of claim 4, wherein the conducting cylinders are an odd number of guide wavelengths long.

6. The method of claim 1, wherein the pulsed microwave energy comprises pulsed microwave radiation in a frequency range from 300 MHz to 300 GHz.

7. The method of claim 1, comprising coupling additional microwave sources to the electromagnetically resonant structure containing the medium being reacted.

8. The method of claim 1, including adding additional acoustic energy to the electromagnetically resonant structure by one or more of a plurality of shock tubes, a plurality of transducers, a plurality of spark gaps, and wherein the additional acoustic energy is at same or different frequencies as a repetition rate of the applied pulsed microwave energy.

9. The method of claim 1, wherein the medium is a liquid, a gas, a powder, a solid or a mixture of these.

10. The method of claim 1, including adding additional energy to the method from both microwave and acoustic sources.

* * * * *